United States Patent Office 2,999,259
Patented Sept. 12, 1961

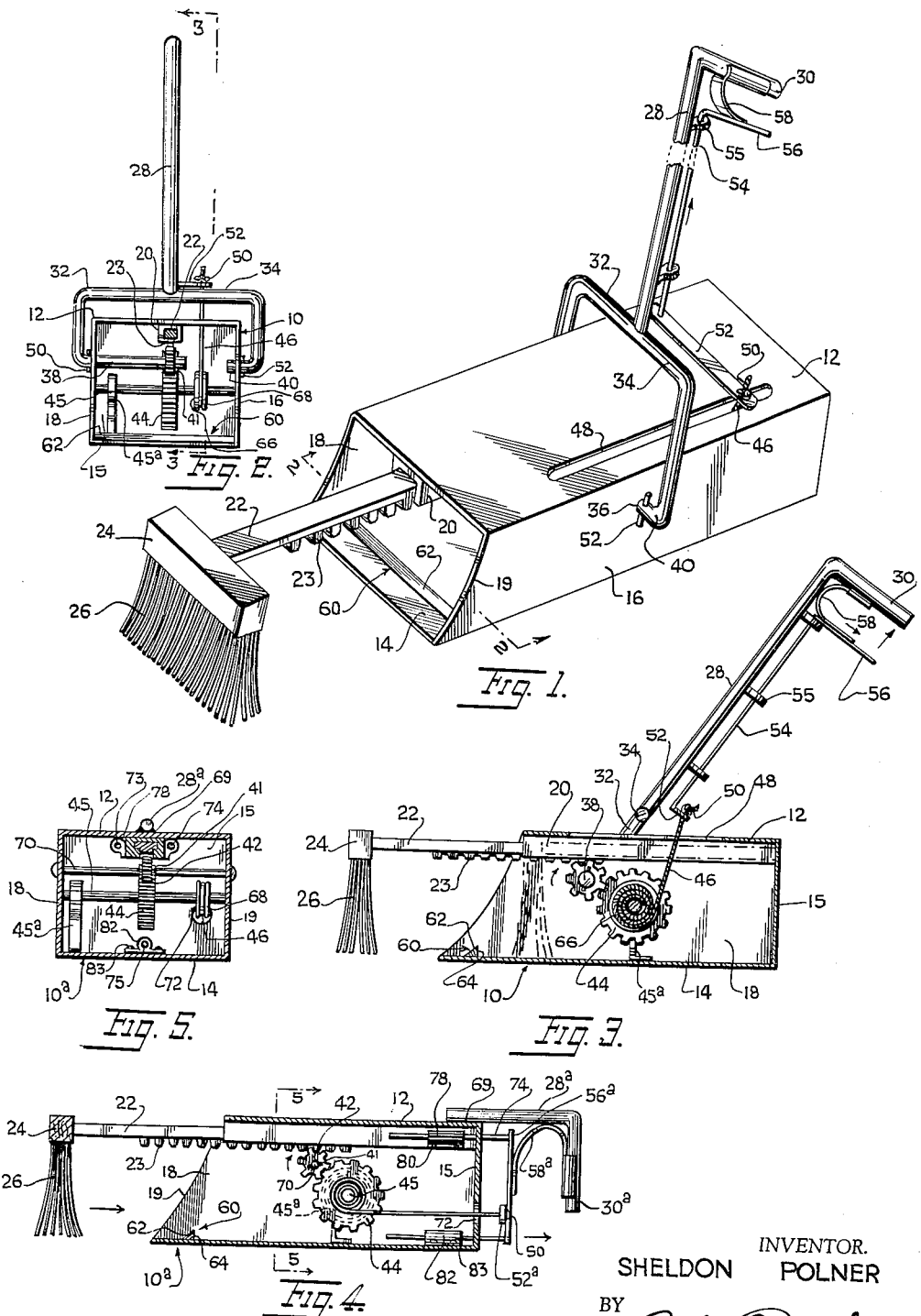

2,999,259
COMBINATION DUST PAN AND BRUSH
Sheldon Polner, 3076 36th St., Astoria, N.Y.
Filed Feb. 19, 1960, Ser. No. 9,907
3 Claims. (Cl. 15—104.8)

This invention concerns an improved dustpan and brush.

A principal object of the invention is to provide a dustpan with a brush movably supported thereon, and provided with retraction means so that by squeezing a handle the brush is retracted into the pan sweeping dust and debris.

A further object is the provision of a dustpan with a long handle and with a brush movably supported on the pan and operatively connected with the handle so that when the handle is operated the brush is retracted into the pan.

A further object is the provision of a dustpan of the character described with scraping means for cleaning the brush as it is retracted into the pan and for retaining dust and debris in the pan.

The invention permits one hand operation in cleaning sweepings from a floor, gathering crumbs from a table, and similar operations leaving the user with the other hand free.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a device embodying the invention.

FIG. 2 is an elevational sectional view taken on line 2—2 of FIG. 1.

FIG. 3 is a sectional view taken on line 3—3 of FIG. 2.

FIG. 4 is a sectional view similar to FIG. 3 showing another form of the invention.

FIG. 5 is a sectional view taken on line 5—5 of FIG. 4.

Referring to FIGS. 1–3, there is shown a generally rectangular pan 10 having a flat top 12, bottom 14, rear 15, sides 16 and 18. The bottom 14 extends further front than the top since the forward edges 19 of the sides are inclined or curved from bottom to top. Supported at the underside of the top 12 is a channel bar 20 in which is slidably mounted a bar 22 having rack gear teeth 23 extending downwards out of the channel bar 20. Secured to the outer end of bar 22 is a brush 24 whose bristles 26 extend downwards so that they are coplanar with the bottom 14. An elongated handle 28 is provided for the device. This handle has an upper hand grip end 30 bent perpendicularly thereto. The lower end of the handle is formed with bifurcations 32, 34. These bifurcations are generally U-shape and their ends 38, 40 are pivotally disposed in holes 36 in the sides of the pan. The end 38 carries a gear 42 freely rotatable thereon. Pins 41 on opposite sides of the gear retain the gear in place on the end of the handle. Further pins 50, 52 are inserted in the ends 38, 40 to prevent lateral movement of the handle with respect to the pan. The handle is pivotable on the axially aligned ends 38, 40 in a vertical plane.

Gear 42 is meshed with the teeth 23 of bar 22 at all times. Engaged with the spur gear 42 is a large gear 44. This gear is rotatably carried on a shaft 45 to which the gear is secured. A flexible wire cable 46 is wound for several turns around shaft 45 and is secured to this shaft at its end so that when the cable is pulled outwardly the shaft and gears 42, 44 rotate. The cable passes through a slot 48 in the top of the pan. The cable terminates in a knot or knob 50 on a bracket plate 52. The plate 52 is supported at the lower end of a rod 54. Rod 54 is slidably disposed in bracket loops 55 extending radially outward from handle 28. Rod 54 terminates at its upper end in a rearwardly extending portion 56 parallel to hand grip 30. A leaf spring 58 is secured by welding or otherwise only to the underside of hand grip 30 and bears on the upper side of rod portion 56. Rod portion 56 serves as a finger grip to coact with hand grip 30. When the rod portion 56 is grasped and squeezed with the fingers of one hand, the rod is retracted, cable 46 unwinds from shaft 45, and the cooperating gears 42, 44 cause the rack gear 22 to be retracted. Thus, the brush is caused to sweep debris into the pan. A coil spring 45$^a$ mounted on shaft 45 serves to reverse rotation of the shaft and gears 42, 44 and extends the brush 24 out of the pan.

Located at the bottom of the pan just within the forward edge thereof is a scraper bar 60. This bar has a curved outer side 62 and provides a means for scraping and flicking dust and dirt off the bristles as the brush is retracted into the pan. The curved side guides the lower ends of the bristles and the driven dirt into the pan. The released dirt and debris is trapped in the pan since the scraper bar provides a retaining wall at its rear side 64. The bar prevents the accumulated dirt from coming out of the pan during use. When the hand and finger grips 30, 56 are released the leaf spring 58 expands, extending the brush out of the pan, as best shown in FIGS. 1 and 3. A pair of disks 66, 68 are mounted on opposite sides of the cable on shaft 45 to guide the cable in winding on and unwinding from the shaft.

The device enables floor sweepings to be gathered in the pan without the user's stooping. Only one hand is necessary to use the pan and actuate the brush.

In the form of the invention shown in FIGS. 4 and 5, handle 28$^a$ is short and L-shaped and is secured by welding 69 to the top of the pan. The gear and cable mechanism for actuating the brush is the same as previously described. A shaft 70 supports gear 42. Cable 46 passes through a hole 72 in the rear 15 of the pan 10$^a$ and terminates in bracket plate 52$^a$. The bracket plate is secured to finger grip 56$^a$ which is a plate to which are attached three rods 73, 74, 75. The upper pair of rods 73, 74 are slidably disposed in cylindrical sleeves 78 secured by screws 80 to the sides of channel bar 22. A third sleeve 82 is secured by screws 83 to the bottom of the pan. The three rods slide in the sleeves when the finger grip is retracted and extended against the bias in leaf spring 58$^a$ secured to the inner side of hand grip 30$^a$. Spring 45$^a$ operates in the same manner in the device of FIGS. 1–3.

This form of the invention makes it possible to use the device on a table or other elevated surface. The user will use the hand and finger grips by squeezing toward each other and sweeping dust and crumbs from a table into the pan. The device is thus an effective "silent butler" appliance with the addition of a one-hand operated brush.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A portable dustpan assembly, comprising a generally rectangular pan having a flat top, bottom and sides and rear and with an open front, a brush retractively mounted at said open front and normally extending forwardly thereof, a handle pivotally mounted on the pan, means operatively connecting said handle and brush for retracting the brush into the pan and extending the brush therefrom, said means comprising a rack gear, said brush being attached to one end of the gear, a channel bar mounted at the underside of said top, said gear being slidably mounted in said channel bar, a first spur gear rotatably supported in the pan and meshed with the rack gear, a large spur gear meshed with the first spur gear, a shaft carrying said large gear, a cable wound on said shaft, and finger grip means connected to said cable for retracting the brush into the pan, said handle having an end formed with a hand grip, said finger grip being disposed parallel to the hand grip, a spring disposed between the hand and finger grips for biasing the grips apart, and a second spring mounted on said shaft retaining the brush extended out of the pan, said handle being an elongated member having bifurcations at the other end, said bifurcations being pivotally engaged in holes in the sides of the pan, said first spur gear being supported by one of said bifurcations, and means in common for scraping debris from the brush and for retaining the debris on the pan.

2. A portable dustpan assembly, comprising a generally rectangular pan having a flat top, bottom and sides and rear and with an open front, a brush retractably mounted at said open front and normally extending forwardly thereof, a handle pivotally mounted on the pan, means operatively connecting said handle and brush for retracting the brush into the pan and extending the brush therefrom, said means comprising a rack gear, said brush being attached to one end of the gear, a channel bar mounted at the underside of said top, said gear being slidably mounted in said channel bar, a first spur gear rotatably supported in the pan and meshed with the rack gear, a large spur gear meshed with the first spur gear, a shaft carrying said large gear, a cable wound on said shaft, and finger grip means connected to said cable for retracting the brush into the pan, said handle having an end formed with a hand grip, said finger grip being disposed parallel to the hand grip, a spring disposed between the hand and finger grips for biasing the grips apart, and a second spring mounted on said shaft retaining the brush extended out of the pan, said finger grip being a rod member slidably supported in bracket members carried by said handle, and a scraper bar disposed on the bottom of the pan near the open front for scraping debris from the brush and for retaining the debris in the pan.

3. A dustpan assembly, comprising a generally rectangular pan having a flat top, bottom, sides and rear and with an open front, a brush retractably mounted at said open front and normally extending forwardly thereof, a handle mounted on the pan, means operatively connecting said handle and brush for retracting the brush into the pan and extending the brush therefrom, said means including a finger grip, said handle including a hand grip, and spring means biasing the finger and hand grips apart, whereby the brush is retracted into the pan when the finger and hand grips are squeezed together, there being a scraper bar disposed on said bottom of the pan near the open front for scraping debris from the brush and for retaining the debris in the pan.

References Cited in the file of this patent

UNITED STATES PATENTS

| | | |
|---|---|---|
| 1,286,076 | Olsiewsky | Nov. 26, 1918 |
| 1,349,582 | Peterson | Aug. 17, 1920 |
| 1,353,222 | Dietzel | Sept. 21, 1920 |
| 2,224,694 | Price | Dec. 10, 1940 |